United States Patent [19]
Buechler et al.

[11] Patent Number: 5,399,843
[45] Date of Patent: Mar. 21, 1995

[54] STACKED ASSEMBLY WITH PRESET END PLAY AND ASSEMBLY METHOD

[75] Inventors: Jean M. Buechler, Goodrich; Walter J. Nill, Davison, both of Mich.

[73] Assignee: Delco Electronics Corp., Kokomo, Ind.

[21] Appl. No.: 220,848

[22] Filed: Mar. 31, 1994

[51] Int. Cl.⁶ ............................................. G01C 22/00
[52] U.S. Cl. ................................... 235/95 R; 235/96; 235/115
[58] Field of Search ............ 235/95 R, 96, 115, 117 R

[56] References Cited

U.S. PATENT DOCUMENTS

| | | | |
|---|---|---|---|
| 34,665 | 3/1862 | Young | 235/117 R |
| 628,340 | 7/1899 | Leuchter | 235/117 R |
| 3,097,792 | 7/1963 | Harada | 235/117 R |
| 3,482,773 | 12/1969 | Hachtel | 235/95 R |
| 3,554,439 | 1/1971 | Sigl | 235/117 R |
| 3,785,551 | 1/1974 | Regan | 235/95 R |
| 3,949,202 | 4/1976 | Bogart | 235/95 R |

*Primary Examiner*—Richard A. Wintercorn
*Assistant Examiner*—Eddie C. Lee
*Attorney, Agent, or Firm*—Jimmy L. Funke

[57] ABSTRACT

A mechanical counter having number wheels rotatably mounted on a shaft with interleaved pinion carriers has a drive gear at one end fixed to the shaft and an end wheel rotatably mounted at the other end and retained by a washer press fit on the shaft. The end wheel has a cavity in its outboard side for receiving the washer, the cavity depth being greater than the washer thickness. The washer is installed by a press tool having a flat surface which engages both the washer and the outboard side of the end wheel to simultaneously advance the washer and seat the parts on the shaft. Then the washer and the bottom of the cavity are spaced by an amount providing the end play.

6 Claims, 1 Drawing Sheet

STACKED ASSEMBLY WITH PRESET END PLAY AND ASSEMBLY METHOD

FIELD OF THE INVENTION

This invention relates to assembling parts on a shaft with accurately controlled end play in the assembly and particularly to a counter mechanism and an assembly method for easily attaining desired end play in the counter wheels.

BACKGROUND OF THE INVENTION

Certain mechanical systems such as gear trains require end play to preclude frictional binding which would result in excessive wear, loss of motion or erratic movement. Current methods of setting end play involve the measurement of the clearance desired during or after assembly of the unit. For example, a mechanical counter such as those used in vehicle odometers comprises a plurality of number wheels and other elements movably mounted on a central shaft with a drive gear fixed to the shaft at one end and a washer press fit onto the shaft at the other end to hold the assembly together. During the assembly when the washer is being pressed on, the number wheels are moved to one end to set the clearance which is measured to assure the correct amount of end play to permit freedom of movement of the parts on the shaft.

Equipment to perform the end play adjustment in high volume production often are complex systems that result in inefficiencies or downtime. The equipment also involves a capital investment and maintenance expense. The inefficiencies result in scrap and rework cost associated with the shortcomings of such equipment.

SUMMARY OF THE INVENTION

It is therefore an object of the invention to assemble mechanical systems such as counters with accurate end play easily and without measurement. Another object is the design of a mechanism susceptible to simple and reliable end play determination. Still another object is to reliably produce in high volume counters and the like without the complex equipment previously used for end play measurement.

Counters used for odometers comprise a shaft with a drive gear fixed to one end, several number wheels rotatably mounted on the shaft, pinion carriers between adjacent number wheels, an end wheel freely mounted on the shaft, and a washer press fit on the shaft to hold the assembly intact, the moveable elements being trapped between the drive gear and the washer. The end wheel has a cavity in one side to receive the washer, the cavity having a depth greater than the washer thickness. Assembly requires that the parts be installed on the shaft in the proper relationship and that the drive gear and the washer be pressed toward one another, sliding on the shaft. The tool which presses on the washer has a flat surface which also presses on the outer face of the end wheel to keep the washer coplanar with the outer face of the end wheel as the washer and end wheel are simultaneously advanced along the shaft. The end wheel and washer are pressed onto the shaft until the other parts are pressed into firm contact or a solid column, the press force being applied through the moveable elements via the drive gear and the end wheel. At that point the washer will be spaced from the bottom of the cavity, and that spacing is the amount of end play in the assembly after removal from the press.

This unique product design and assembly technique affords a simple and accurate determination of end play, requiring no measurement to assure the amount of end play. Where the end wheel is formed by plastic molding, the cavity depth is controlled accurately, and washer thickness is easily controlled. Thus the desired end play is established by the part design and fabrication steps and the burden of proper calibration and measurement is removed from the final assembly process.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to the design and assembly of a counter mechanism, it will be appreciated that other like mechanisms can be fabricated in a manner to employ the same principle for determining accurate end play.

Figures 2, 3:
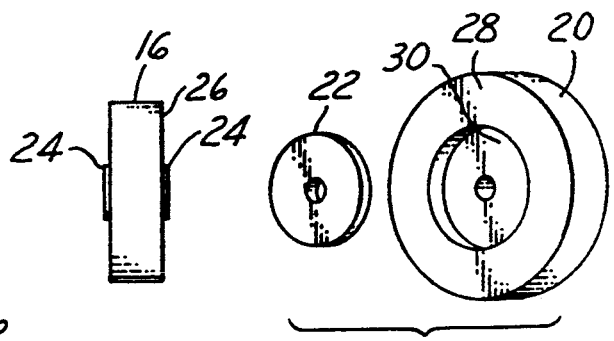
FIG. 2 is an elevational view of number wheel of the counter of FIG. 1.
FIG. 3 is an exploded isometric view of the washer and end wheel of the counter of FIG. 1, according to the invention.
Figure 1:
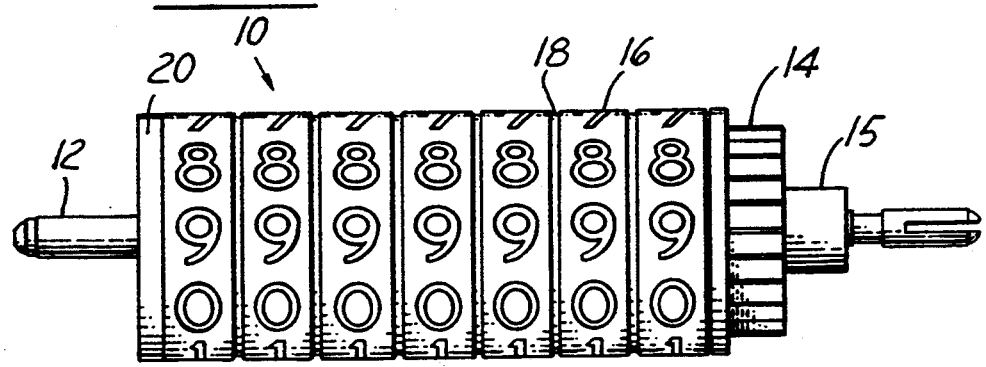
FIG. 1 is an elevational view of a counter.

Referring to FIGS. 1, 2 and 3, a mechanical counter 10 of the type used for motor vehicle odometers comprises a central shaft 12, a drive gear 14 having a prominent outer hub 15 press fit onto the shaft at one end, a stack of parts comprising alternating number wheels 16 and stationary disk-like pinion carriers 18 freely mounted on the shaft, a relatively rotatable end wheel 20 at the end opposite the drive gear 14, and a washer 22 press fit on the shaft 12. Pinions, not shown, carried by the pinion carriers 18 engage internal teeth on the number wheels and the drive gear, also not shown, to transfer rotation from the drive gear progressively along the stack of number wheels. Each number wheel 16 has a hub 24 extending a small distance beyond each side 26 of the wheel, the ends of the hubs 24 providing the bearing surfaces with the adjacent carriers 18. As thus far described, the construction and operation of the counter 10 is well known and is commercially available, and to that extent further details need not be given here. The end wheel 20 structure and its relationship with the washer 22, however, depart from the prior known mechanisms.

Figure 4:
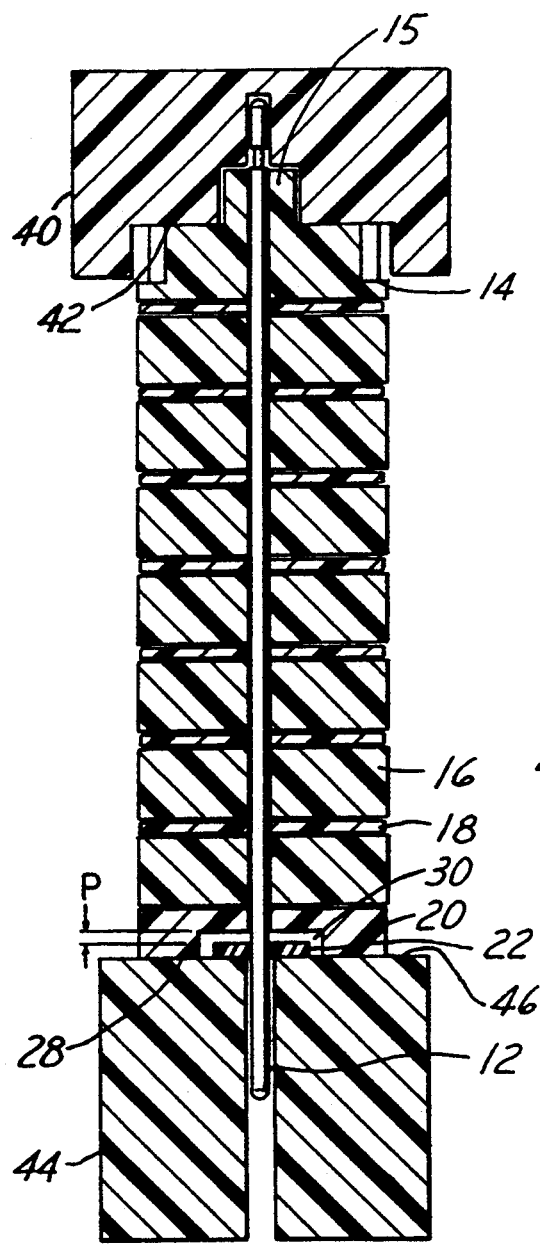
FIG. 4 is a cross sectional view of the counter illustrated in FIG. 1 and press tooling for a counter assembly, according to the invention.

The end wheel 20 has an outboard side 28 which, in assembly, faces away from the number wheels 16, and contains a generally cylindrical central cavity 30 having a diameter larger than the washer 22 and a depth greater than the thickness of the washer 22, so that when assembled the cavity encompasses the washer. The parts are assembled such that when the end wheel 20 is urged toward the drive gear causing firm contact between the intervening elements 16 and 18, the outer face of the washer 22 is coplanar with the outboard side 28 of the end wheel 20; then the spacing between the inner face of the washer 22 and the bottom of the cavity 30 is equal to the end play of the assembly. In FIG. 4 this spacing is labelled as the dimension P and is, for example, on the order of 0.008 to 0.016 inch.

The end wheel 20 is preferably made by plastic molding so that the cavity depth can be accurately determined, and the washer is stamped from sheet metal, allowing its thickness to be accurately controlled. Then the difference of the cavity depth and the washer thickness is likewise accurately controlled and comprises the end play. The counter 10 is fabricated by installing the number wheels 16, carriers 18 with their pinions, and the end wheel 20 on the shaft 12, and pressing on the drive gear 14 and washer 22 to contain the assembly. FIG. 4 shows a cross sectional view of the counter of FIG. 1 and the other parts in the final stage of assembly along with an upper press tool 40 which has a stepped bore 42 to fit over the drive gear and press down on the drive gear, and a lower press tool 44 which has a flat upper face 46 to press up on the washer 22 and the outboard face 28 of the end wheel 20. Both tools 40, 44 have axial bores to accommodate the ends of the shaft 12. By moving the tool 44 toward tool 40, the counter parts are pressed firmly together until the number wheels 16 through the hubs 24 contact the carriers 18 and the end wheel 20. When a preset press force is attained the press movement is halted, the counter parts having reached the position shown in FIG. 4 with the clearance P between the washer 22 and the bottom of cavity 30. When the assembly is removed from the press, the parts between the drive gear 14 and the washer 22 are free to move axially to the extent of the end play dimension P.

We claim:

1. A mechanism having a stack of parts assembled on a shaft between a fixed end member and a retainer for limited movement thereon and with end play comprising:

an end part of the stack remote from the fixed end member and movably mounted relative to the shaft, the end part having an outboard side defining a cavity, the cavity having an axial dimension;

the retainer being press fit on the shaft and resident within the cavity of the end part for holding the end part on the shaft, the retainer having a thickness less than the axial dimension of the cavity and having an outboard face flush with the outboard side of the end part when the stack of parts is firmly pressed together against the fixed end member, whereby the amount of end play is established by the difference between the retainer thickness and the axial dimension of the cavity.

2. The invention as defined in claim 1 wherein the end part is a molded part having an accurately dimensioned cavity, and the retainer is a washer of controlled thickness so that the difference between the washer thickness and the axial dimension of the cavity is accurate.

3. The invention as defined in claim 1 wherein the mechanism is a counter, the stack of parts includes number wheels, the end member is a drive gear, the retainer is a washer, and the end part is a molded end wheel with an accurately formed cavity, wherein the number wheels are free to rotate due to end play assured by the end wheel and washer dimensions.

4. A method of assembling a stack of elements on a shaft comprising an end member and a washer press fit on the shaft and a plurality of intervening parts including an end part relatively moveable on the shaft and having an outer surface engageable with the washer, such that the intervening parts enjoy a desired amount of end play, comprising the steps of:

assembling the elements on the shaft with an outer surface of the end part facing the washer; and pressing the end member and the end part together until the intervening parts are firmly seated together, and simultaneously pressing the washer toward the end member while maintaining a distance between the washer and the outer surface equal to the desired amount of end play.

5. A method of assembling a stack of elements on a shaft comprising an end member and a washer press fit on the shaft and a plurality of intervening parts relatively moveable on the shaft with a prescribed amount of end play, comprising the steps of:

forming in an end element of the stack a cavity large enough to receive the washer, the cavity having a recessed face and having a depth exceeding the thickness of the washer;

assembling the elements on the shaft with the cavity encompassing the washer; and pressing the end element and the washer together with the outer faces of the end element and the washer flush, until the intervening parts are firmly seated together, whereby the difference of the cavity depth and the washer thickness determines the amount of end play.

6. The invention as defined in claim 5 wherein the resulting assembly is a counter and the end member is a drive gear, the intervening parts comprise number wheel and pinion carriers, and the end part is an end wheel, and wherein the step of forming a cavity comprises plastic molding an end wheel with an accurately dimensioned cavity.

* * * * *